United States Patent

[11] 3,628,334

| [72] | Inventor | Arthur J. Coleman<br>1841 N.E. 42nd St., Pompano Beach, Fla. 33064 |
|---|---|---|
| [21] | Appl. No. | 846,372 |
| [22] | Filed | July 31, 1969 |
| [45] | Patented | Dec. 21, 1971 |

[54] FLOATING BREAKWATER
8 Claims, 6 Drawing Figs.

| [52] | U.S. Cl. | 61/5 |
|---|---|---|
| [51] | Int. Cl. | E02b 3/06 |
| [50] | Field of Search | 61/1, 3, 4, 5, 6 |

[56] References Cited
UNITED STATES PATENTS

| 1,004,718 | 10/1911 | Wieland | 61/1 F |
|---|---|---|---|
| 307,393 | 10/1884 | Hyde | 61/5 |
| 411,979 | 10/1889 | Coult | 61/5 |
| 3,022,632 | 2/1962 | Parks | 61/5 |
| 3,357,192 | 12/1967 | Hibarger | 61/5 |

*Primary Examiner*—Peter M. Caun
*Attorneys*—Clarence A. O'Brien and Harvey B. Jacobson

ABSTRACT: A series of hollow rigid spherical floats anchored in an offshore grouping so as to act in the manner of a breakwater for breaking up and smoothing wave action. Each of the floats is anchored to the bottom by a flexible cable and, through internal ballast, rides partially submerged in the water.

Arthur J. Coleman
INVENTOR.

BY Clarence A. O'Brien
and Harvey B. Jacobson
Attorneys

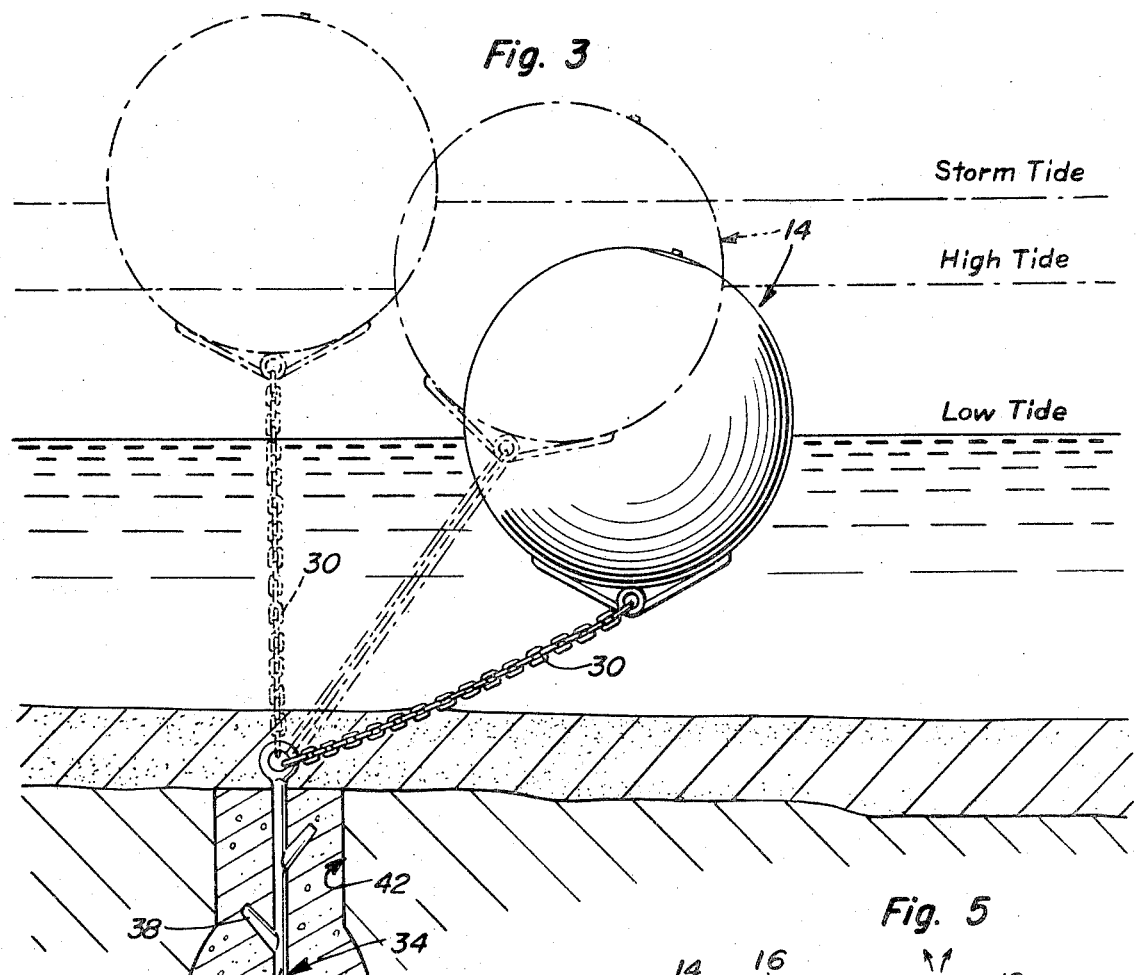
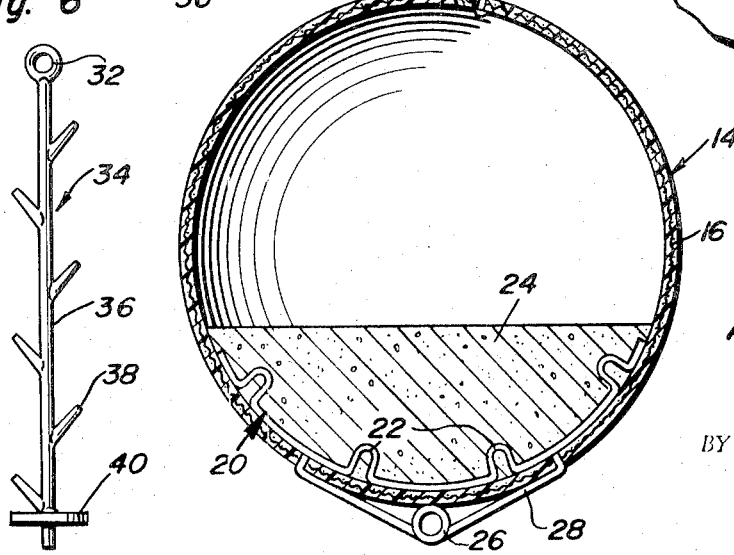

FLOATING BREAKWATER

The instant invention is generally concerned with the protection of beaches, and more particularly relates to a novel breakwater system incorporating a plurality of uniquely formed floats adapted to ride partially submerged in the path of incoming waves in a manner so as to intercept, break up and smooth out the waves so as to preclude the creation of a beach destroying undertow and pounding wave action.

It is a primary object of the instant invention to provide an effective means for eliminating or at least substantially reducing the erosion effect along shorelines resulting from wave action. As will be appreciated, such erosion, if left unchecked, could give rise to substantial problems, including the undermining of beach front properties and the destruction of beaches. As a means for eliminating or substantially reducing the eroding effect of the action of the waves, the instant invention proposes a breakwater consisting of a series of hollow floats, normally arranged in two rows with the floats alternating therein. Each of the floats, in the nature of an enlarged ball having internal ballast so as to maintain the ball partially submerged, is anchored to the ocean bottom by an elongated flexible chain or cable which enables the float to maintain its partially submerged position through the full range of tides experienced at the particular location. These balls, located offshore a distance contemplated to most effectively intercept the waves and in effect break up the waves before the full development thereof, will, through the flexible positioning chains, be easily displaced so as to allow for passage of watercraft thereby, and will, at the same time, be easily visible through the provision of brilliant coloring thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged elevational view of one of the breakwater floats wherein the three major operating positions thereof are illustrated;

FIG. 4 is an enlarged cross-sectional view taken through one of the floats;

FIG. 5 is an enlarged cross-sectional detail illustrating the float air vent; and FIG. 6 is an elevational view of the anchor utilized in conjunction with each float.

Figure 1:
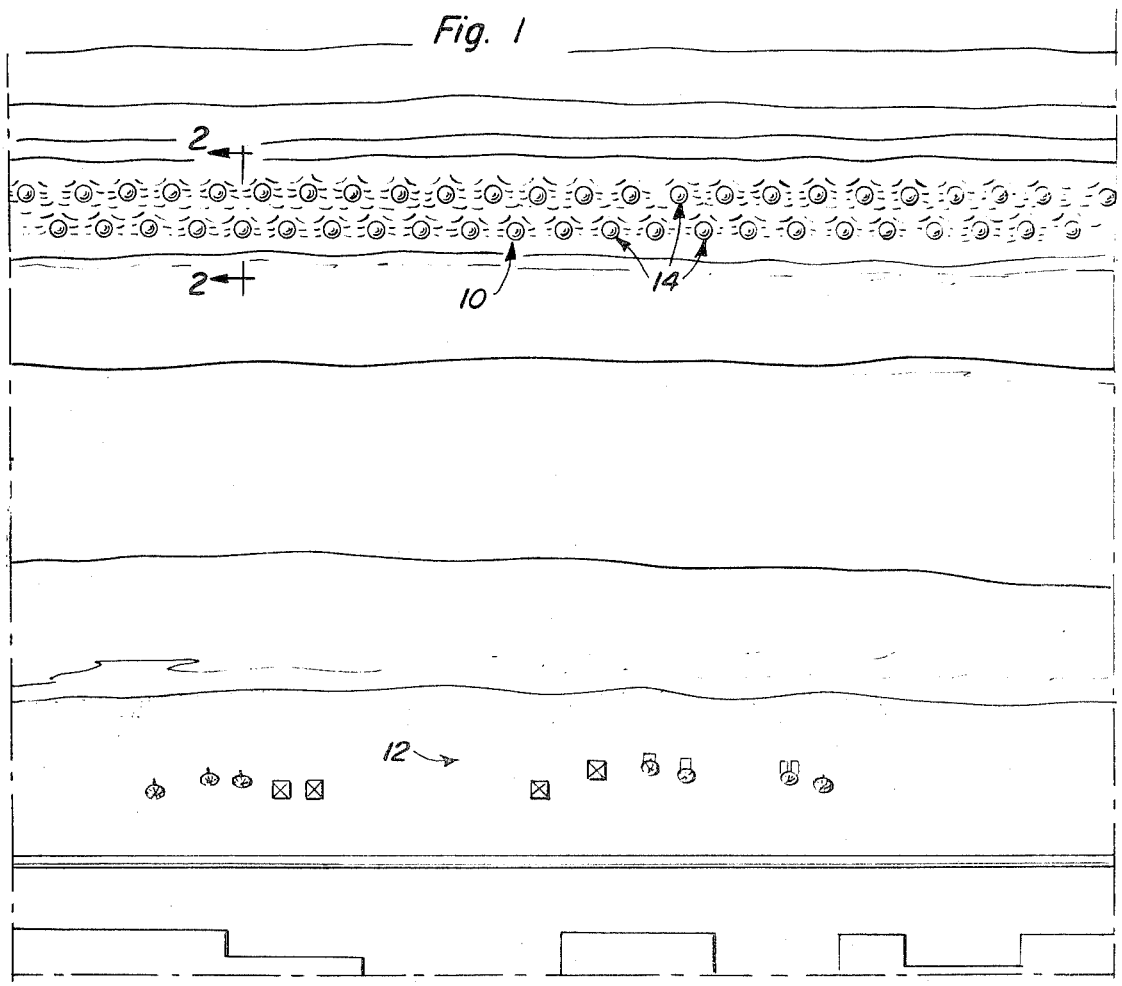
FIG. 1 is a plan view of a section of beach and offshore area with a breakwater constructed in accordance with the instant invention.
Figure 2:
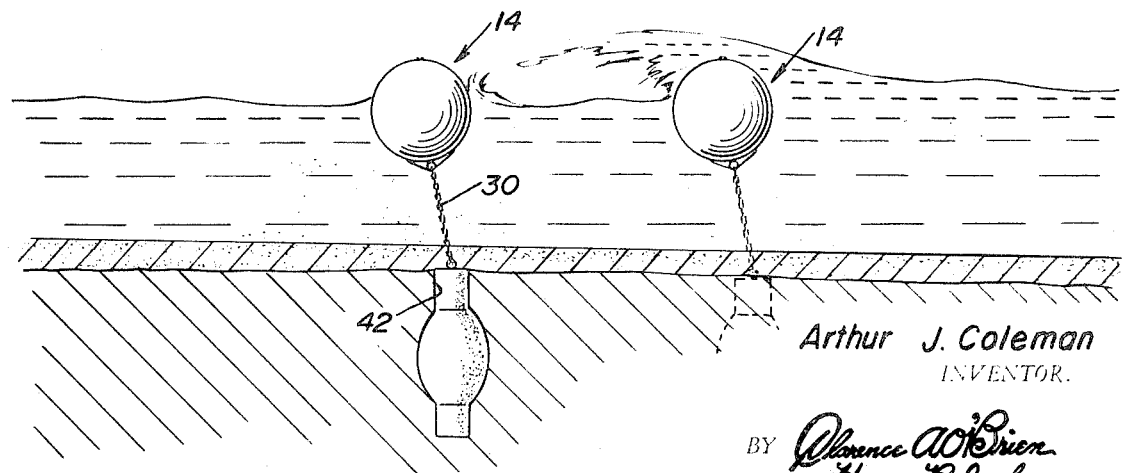
FIG. 2 is an enlarged cross-sectional view taken substantially on a plane passing along line 2—2 in FIG. 1 and illustrating the wave breaking action of the breakwater.

Referring now more specifically to the drawings, reference numeral 10 is used to generally designate a breakwater constructed in accordance with the instant invention. This breakwater 10 will normally be positioned approximately 350 feet out from the low water or low tide mark at an area 12 which is to be protected from the eroding action of the incoming waves.

The breakwater 10 consists of a series of rigid hollow spherical floats 14, preferably 10 feet in diameter and orientated at 20-foot intervals in two rows, the floats in each row alternating with the floats in the other row in a manner which will be obvious from FIG. 1.

Each float 14 is preferably constructed of fiber glass molded about an internal reinforcing mesh 16 and preferably either painted or impregnated with a bright easily visible color for navigational safety. An air relief opening or valve 18 will be provided through the hollow rigid ball-like float toward the upper end thereof so as to preclude any internal pressure buildup such as can be expected should the float 14 be subjected to long period of exposure to the hot sun.

Internally, each ball-like float 14 is provided with one or more metal rods 20 affixed, as by partial embedment or the like, to the inner surface of the float 14 about the lower portion thereof. This rod 20 includes a series of inwardly projecting loops 22 which act so as to positively anchor an internally positioned ballast 24, preferably poured concrete. The ballast 24 is provided so as to partially submerge the float 14 in a manner whereby only approximately the upper half of the float 14 rides above the water. The float thus orientated will effectively counteract the action of the waves both above and below the surface of the water, and will at the same time possess a degree of stability so as to avoid any excessive swaying or rolling action.

Each float 14 includes an external anchor ring 26 orientated in generally opposed relation to the vent 18 and firmly anchored to the float 114 by appropriate rods 28 affixed at one end to the ring 26, as by welding, and embedded within the material of the float 14 at the other end. These rods 28 can, if so desired, actually have the outer ends thereof welded to the internally located ballast anchoring rod or rods 20.

An elongated flexible cable or chain 30 extends from locked engagement with each float ring 26 to locked engagement with an integrally formed eye portion 32 on the upper end of a bottom embedded anchor 34. This chain 30 is of a length so as to enable a riding of the associated float in the desired half submerged orientation at all the major tide positions from the minimum low tide to the maximum storm tide. In this manner, the wave breaking action of the floats 14 will be provided under all anticipated tide circumstances.

The anchor 34 itself is preferably in the nature of an elongated rigid rod or spike 36 provided with a series of upwardly and outwardly directed spurs or short projecting members 38 at spaced points along the length thereof, and an enlarged flat circular plate 40 surrounding the lower end portion of the rod 36 and also rigidly affixed thereto. If so desired, the individual spurs 38 can be pivotally mounted so as to close upon an introduction of the anchor into the sea bottom and open upon any tendency for the anchor to move upwardly out of the bottom.

Should circumstances deem it advisable, such as when anchoring in the coral sea bottoms found off the southern coast of Florida, a bore 42 can be drilled into the bottom and the anchor 34 cemented into place therein. Such bores 42, as will be appreciated from the drawings, will normally include an outwardly bulging portion along the length thereof into which the anchor securing concrete will expand so as to enhance the anchoring ability thereof and avoid any tendency for the formed concrete plug being dislocated.

From the foregoing, it should be appreciated that a highly unique breakwater has been defined, this breakwater being constructed of a series of specifically formed bottom anchored floats, each of which is both hollow and buoyant. The individual floats include internally anchored ballast which is so related to the buoyancy of the float as to retain the float half-submerged, thereby counteracting the action of the waves both above and below the surface of the water. Each float is engaged with a bottom embedded anchor by an elongated flexible chain or cable which acts so as to retain the basic orientation of the individual float while enabling a movement of the float with the tides, the float retaining the desired partially submerged orientation at all anticipated tides from a minimum low tide to a maximum storm tide. Incidentally, it will be appreciated that while the breakwater of the instant invention has been described as being specifically adapted for the protection of the shoreline, if so desired, utilization of the breakwater as a means for protecting offshore drilling rigs or the like would also be feasible.

The foregoing is considered as illustrative only of the principles of the invention. Further, since numerous m modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A floating breakwater comprising a series of floats orientated in spaced parallel rows, the floats in each row being spaced from each other and offset from the floats in an adjacent row, each of said floats comprising a hollow, rigid, inherently buoyant member which is sufficiently buoyant so as to float with a substantial portion thereof exposed above the surface of the water and in the path of wave movement, a bottom embedded anchor associated with each rigid float, a flexible member extending between each anchor and the corresponding float, said flexible member being of a length enabling vertical movement of the float with the tides while retaining a substantial portion of the float exposed under all tide conditions, each float being spherical, each float including a pressure relief opening therethrough venting the hollow interior thereof to the atmosphere and precluding internal pressure buildup.

2. The breakwater of claim 1 wherein each hollow buoyant float includes ballast positioned interiorly therein to counteract a predetermined portion of the inherent buoyancy of the float.

3. The breakwater of claim 2 including internal anchoring means fixed directly to each float therein, the ballast in each float being engaged with the associated internal anchoring means and secured by the internal anchoring means to the float against movement therein.

4. A floating breakwater comprising a series of floats orientated in spaced parallel rows, the floats in each row being spaced from each other and offset from the floats in an adjacent row, each of said floats being sufficiently buoyant so as to float with a substantial portion thereof exposed above the surface of the water and in the path of wave movement, a bottom embedded anchor associated with each float, a flexible member extending between each anchor and corresponding float, said flexible member being of a length enabling vertical movement of the float with the tides while retaining a substantial portion of the float exposed under all tide conditions, each float being hollow, spherical and rigid, each float including a pressure relief opening therethrough, each float including ballast positioned interiorly therein, internal anchoring means fixed directly to each float, the ballast in each float being engaged with the associated anchoring means and secured by the anchoring means to the float against movement therein, the internal anchoring means in each float being in the nature of an elongated rod having inwardly directed offset portions therein.

5. The breakwater of claim 4 including an external ring fixed to each float generally opposed from the pressure relief opening therein.

6. The breakwater of claim 5 wherein each bottom embedded anchor is in the nature of an elongated rod having upwardly and outwardly angled members fixed thereto.

7. A breakwater forming float, said float being rigid, hollow, generally spherical, and inherently buoyant, a bottom embedded anchor, and an elongated flexible member engaged between said anchor and said float, said float being sufficiently buoyant so as to float partially above the surface of the water, said flexible member being of a length so as to enable a vertical movement of the float with the tides while maintaining the partially exposed orientation of the float at all tides, said flexible member, at the maximum tide, extending substantially perpendicularly upward from the ground embedded anchor, said float including internally located ballast for maintenance of the float approximately half submerged in a body of water, and internal anchoring means within the float, said internal anchoring means being rigidly affixed to the float and including projecting portions thereon for rigid engagement with the ballast, and a float anchored external ring for engagement with the flexible member, the internal anchoring means comprising an elongated rod having inwardly directed offset portions therein.

8. A floating breakwater comprising a series of floats orientated in spaced parallel rows, the floats in each row being spaced from each other and offset from the floats in an adjacent row, each of said floats comprising a hollow, rigid, inherently buoyant member which is sufficiently buoyant so as to float with a substantial portion thereof exposed above the surface of the water and in the path of wave movement, a bottom embedded anchor associated with each rigid float, a flexible member extending between each anchor and the corresponding float, said flexible member being of a length enabling vertical movement of the float with the tides while retaining a substantial portion of the float exposed under all tide conditions, each hollow buoyant float including ballast positioned interiorly therein to counteract a predetermined portion of the inherent buoyancy of the float, internal anchoring means fixed directly to each float therein, the ballast in each float being engaged with the associated internal anchoring means and secured by the internal anchoring means to the float against movement therein, the internal anchoring means in each float being in the nature of an elongated rod having inwardly directed offset portions therein.

* * * * *